US010661809B2

(12) United States Patent
Winblad Von Valter et al.

(10) Patent No.: US 10,661,809 B2
(45) Date of Patent: May 26, 2020

(54) METHOD AND SYSTEM AT ACTIVATION OF A FAULT CODE IN A CONTROL SYSTEM, AND VEHICLE COMPRISING THE SYSTEM

(71) Applicant: SCANIA CV AB, Södertälje (SE)

(72) Inventors: Viktor Winblad Von Valter, Nyköping (SE); Rasmus Backman, Södertälje (SE)

(73) Assignee: Scania CV AB, Södertälje (SE)

(*) Notice: Subject to any disclaimer, the term of this patent is extended or adjusted under 35 U.S.C. 154(b) by 463 days.

(21) Appl. No.: 15/034,908

(22) PCT Filed: Nov. 28, 2014

(86) PCT No.: PCT/SE2014/051423
§ 371 (c)(1),
(2) Date: May 6, 2016

(87) PCT Pub. No.: WO2015/084237
PCT Pub. Date: Jun. 11, 2015

(65) Prior Publication Data
US 2016/0280231 A1 Sep. 29, 2016

(30) Foreign Application Priority Data
Dec. 3, 2013 (SE) .................................. 1351434

(51) Int. Cl.
B60W 50/02 (2012.01)
G07C 5/08 (2006.01)

(52) U.S. Cl.
CPC . B60W 50/0205 (2013.01); B60W 2050/0215 (2013.01); G07C 5/0808 (2013.01)

(58) Field of Classification Search
CPC ......... B60W 50/0205; B60W 50/0225; B60W 2050/0215; G07C 5/0808
See application file for complete search history.

(56) References Cited

U.S. PATENT DOCUMENTS 4,833,613 A * 5/1989 MacK .................. B60W 10/06
477/906
6,112,150 A * 8/2000 Irons ..................... F02D 41/266
701/114
(Continued)

FOREIGN PATENT DOCUMENTS

EP 1283501 A2 2/2003
WO 2004044546 A1 5/2004
(Continued)

OTHER PUBLICATIONS

International Search Report for PCT/SE2014/051423 dated Feb. 23, 2015.
(Continued)

Primary Examiner — Donald J Wallace
(74) Attorney, Agent, or Firm — Moore & Van Allen PLLC; W. Kevin Ransom

(57) ABSTRACT

Disclosed is a method to determine parameter values after an activation of a first error code in a control system, wherein said control system comprises at least one control device for control of at least one first function at least partly with the use of sensor signals, and wherein said at least one control device is arranged to activate said first error code when a first condition for deactivation of said first error code has been met. The method comprises, when said first error code has been activated: determining whether said first condition for activation of said first error code is still met; and determining parameter values for a first set of parameters where said first condition is no longer met.

20 Claims, 3 Drawing Sheets

(56) References Cited

U.S. PATENT DOCUMENTS

| | | | |
|---|---|---|---|
| 7,260,505 B2* | 8/2007 | Felke | G05B 23/0216 |
| | | | 701/31.4 |
| 2008/0162025 A1 | 7/2008 | Groer et al. | |
| 2009/0055042 A1 | 2/2009 | Regnard De Lagny et al. | |
| 2009/0187304 A1 | 7/2009 | Waypa et al. | |
| 2011/0190978 A1 | 8/2011 | Mao et al. | |
| 2011/0238258 A1* | 9/2011 | Singh | G07C 5/0808 |
| | | | 701/31.4 |
| 2013/0030641 A1* | 1/2013 | Olsen | G05B 23/0283 |
| | | | 701/31.6 |

FOREIGN PATENT DOCUMENTS

| | | |
|---|---|---|
| WO | WO-2004/053767 A1 | 6/2004 |
| WO | WO-2013/105891 A1 | 7/2013 |

OTHER PUBLICATIONS

Korean Office Action for Korean Patent Application No. 10-2016-7017797 dated Oct. 30, 2017.
European Search Report from the European Patent Office for PCT/SE2014/051423 dated Jul. 24, 2017.
SCANIA CV AB, International Application No. PCT/SE2014/051423, International Preliminary Report on Patentability, dated Jun. 7, 2016.

* cited by examiner

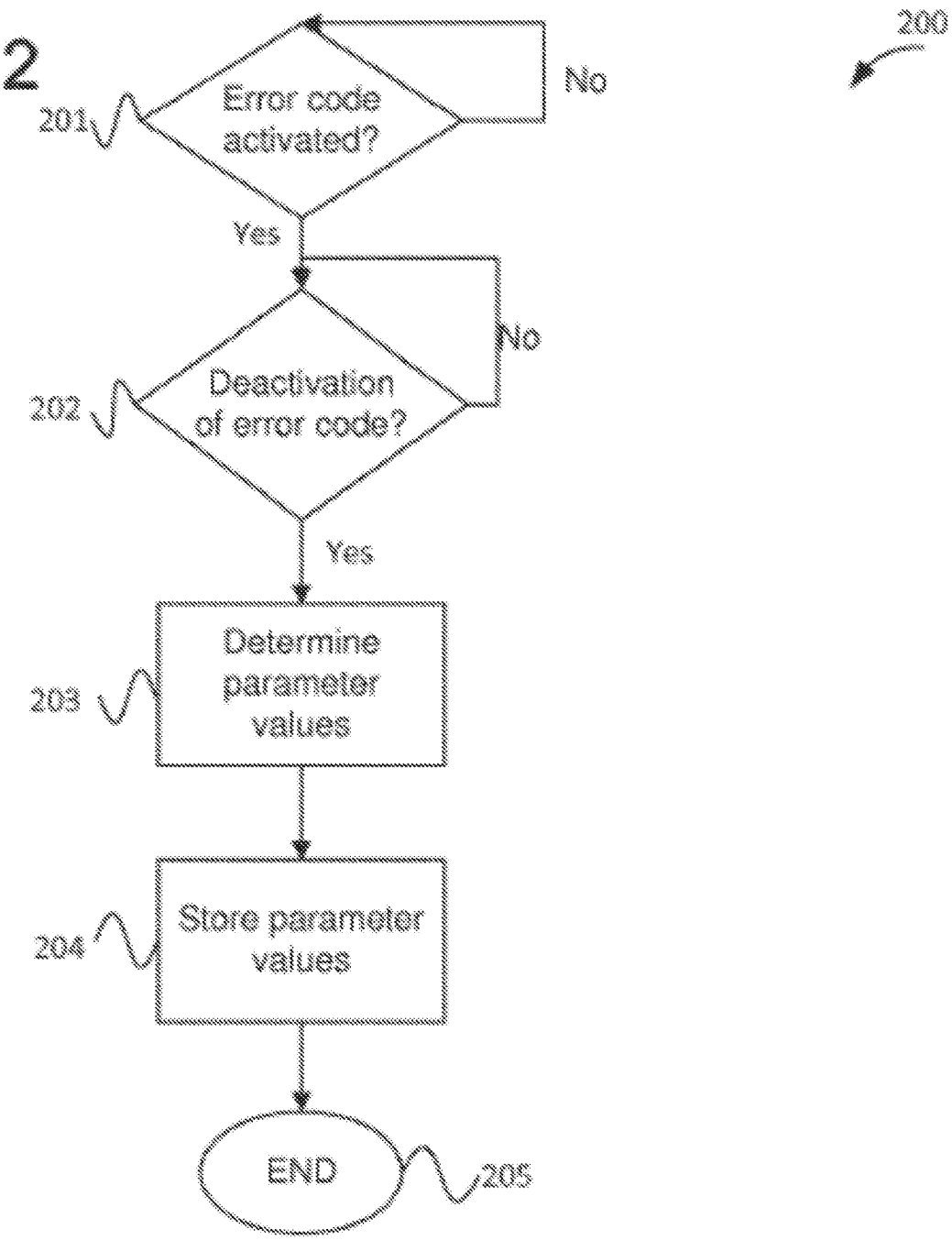

METHOD AND SYSTEM AT ACTIVATION OF A FAULT CODE IN A CONTROL SYSTEM, AND VEHICLE COMPRISING THE SYSTEM

CROSS-REFERENCE TO RELATED APPLICATIONS

The application is a national stage application (filed under 35 U.S.C. § 371) of PCT/SE2014/051423 filed Nov. 28, 2014 of the same title, which, in turn, claims priority to Swedish Application No. 1351434-4 filed Dec. 3, 2014 of the same title; the contents of each of which are hereby incorporated by reference.

FIELD OF THE INVENTION

The invention relates to a method, system, vehicle, and computer program product to determine parameter values after an activation of an error code in a control system.

BACKGROUND

Within the automotive industry, but also within e.g. the shipping industry and industrial machinery, control systems are applied which, in addition to control of different functions, are used for diagnosing such functions.

With respect to e.g. vehicles these often comprise a large number of sensors, each of which emits signals representing parameter values relating to one of several different parameters with respect to the vehicle's performance/function.

Examples of such parameters/parameter values consist of different temperatures, engine speeds, air flows, fuel flows, throttle positions, vehicle speeds, settings relating to the vehicle's transmission, exhaust emissions, etc.

The sensor signals may be used for control of different functions in the vehicle, and also for diagnosing whether the vehicle functions as intended.

This control/diagnosis is usually carried out by control devices, and with respect to the vehicle, these often comprise several control devices, where one or several sensors may be connected to the respective control device.

In relation to diagnostics, the control devices may be used for monitoring the vehicle's function, where the control device e.g. monitors signals from the connected sensors.

In the event of differences from the expected function, if conditions set are not fulfilled, an error code may be activated, wherein such error code may e.g. be read at a subsequent visit to a garage and be used by the staff at the garage for diagnostic purposes, e.g. in connection with troubleshooting.

With respect to e.g. vehicles there are usually several such error codes defined, which may also be required to be available according to regulatory provisions, and which may accordingly also be detected by general error code readers and thus not only by tools specific to the vehicle manufacturer. In addition to such standardized error codes, additional error codes may be used to further facilitate troubleshooting during a garage visit. Such standardized error codes are generally referred to as diagnostic trouble codes (DTC).

Through the use of such error codes diagnosis may thus be facilitated at garage visits. The error codes may be used to identify errors, and the error codes may also specify where the error is located in the vehicle. Despite the occurrence of such error codes, it may still be difficult to find the cause of an error.

SUMMARY OF THE INVENTION

One objective of the present invention is to provide a method in connection with an activation of an error code. This objective is achieved, with a method according to claim 1.

The present invention relates to a method to determine parameter values after an activation of a first error code in a control system, wherein said control system comprises at least one control device for control of at least one function at least partly with the use of sensor signals, and wherein said at least one control device is arranged to activate said first error code when a first condition for activation of said first error code has been met. The method comprises, when said first error code has been activated:

determining whether said first condition for activation of said first error code is still fulfilled; and determining parameter values for a first set of parameters when said first condition is no longer met.

As mentioned above, one or several error codes may be activated if the specified conditions are met. Activation of the error code may be carried out e.g. by flagging the error code, wherein the error code may e.g. be read at a subsequent garage visit and be used for diagnostic purposes such as troubleshooting.

According to the present invention, a "snapshot" of the prevailing parameter values is determined for a first set of parameters when the conditions for activation of an error code are no longer met, i.e. when the error for some reason no longer remains. It has become apparent that such information may be very valuable in connection with diagnostics, and thus, according to the innovative method, parameter values thus determined are preferably stored so that this information may also be accessed at a garage visit.

The parameter values determined according to the present invention may e.g. be used to detect causes of errors appearing intermittently or only in some situations. For example, a damper may get stuck in a damper housing, with the consequence that an error code is activated, and may later detach, with the consequence that the error code is deactivated. It may be very difficult to determine the cause of such an error at a garage visit, but if the parameter values according to the present invention e.g. show a relatively high or low temperature when the damper detaches, the error may be assumed to be caused by different thermal expansion for the materials in the component parts. Such temperature dependent errors may be very difficult to detect since they rarely appear at a garage.

Further, e.g. a temporarily malfunctioning exhaust purification may turn out to be due to the inlet temperature of the combustion air being too high for a period. At such determination e.g. parameter values from both activation and deactivation may be used, wherein a lower inlet temperature at deactivation may provide a good indication of the probable cause. Further, errors may e.g. arise at some engine speeds, where this cause may be determined more easily according to the invention.

The invention may also be used to confirm suspicions, e.g. in situations where an error is suspected to be due to certain prevailing circumstances, where this has been difficult to show previously, but which may now be confirmed with the use of parameter values determined according to the present invention. Obviously, there are a large number of situations where parameter values determined according to the invention may be very helpful.

Parameter values for said first set of parameters are determined preferably just when it is determined that the conditions for activation of the error code are no longer met, i.e. substantially at the moment when it is determined that the conditions for activation of the error code are no longer met.

A determination of whether conditions for activation of the error code are still met may be arranged to be carried out several times per second, wherein thus parameter values for said first set of parameters may also be determined substantially simultaneously with the determination that the conditions for activation of the error code are no longer met.

According to one embodiment, said parameter values are determined for said first set of parameters within a first time as of the moment when said first condition is no longer met. For example, said first time may consist of a time in one of the ranges 0-30 seconds, 0-10 seconds, 0-5 seconds, 0-1 second, where the range may e.g. depend on how quickly the parameter value changes. Different times may be applied for different parameters. The determined parameter values thus constitute a representation of prevailing parameter values for said first set of parameters at the time the said first condition is no longer met.

It is common for such error codes, after having been activated, and in a situation where the conditions for activation are no longer met, to be deactivated, i.e. the status for the error code specifies that the error code has been, but is no longer activated, so that it is possible at a garage visit to see that the error code has been activated earlier. According to one embodiment, the method comprises, when said first error code has been activated:
  determining whether said first error code has been deactivated; and
  where said first error code has been deactivated, storing the parameter values for a first set of parameters.

According to this embodiment, it is thus determined whether said first condition for activation of said first error code is met by determining whether said first error code has been deactivated. Deactivation of an error code may be arranged to be carried out when a certain time has lapsed since the conditions for activation of the error code are no longer met, so that the determined parameter values thus constitute a representation of the prevailing parameter values for said first set of parameters at the time when said first conditions are no longer met.

The present invention also relates to a method for diagnosing a first function.

Further characteristics of the present invention and advantages thereof will be described in the detailed description of example embodiments set out below and in the enclosed drawings.

BRIEF DESCRIPTION OF THE DRAWINGS

FIG. 2 schematically shows an example method according to one embodiment of the present invention.

DETAILED DESCRIPTION

The present invention will be exemplified below for a vehicle. The invention is also applicable, however, in other types of transport means, such as aircraft and watercraft, as long as a control system diagnoses the function of the transport means, and where an error code may be activated. The invention is also applicable to fixed installations where a control system carries out a corresponding diagnosis.

Figure 1A:
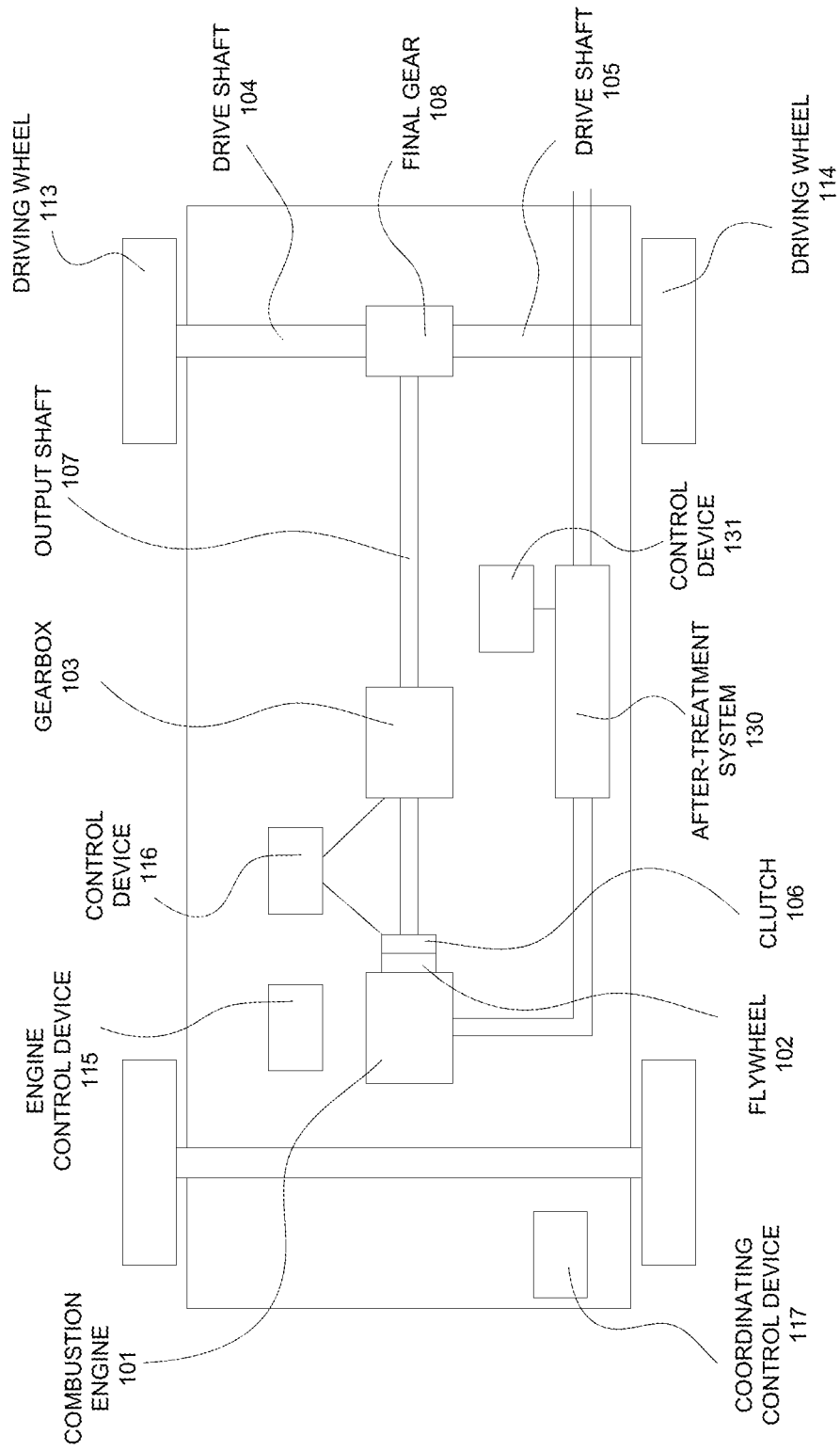
FIG. 1A shows a powertrain in a vehicle, in which the present invention may advantageously be used.

FIG. 1A schematically shows a driveline in a vehicle 100, according to an embodiment of the present invention. The method shown in FIG. schematically in FIG. 1A comprises a driveline with a combustion engine 101, which in a customary manner, via an output shaft on the combustion engine 101, usually via a flywheel 102, is connected to a gearbox 103 via a clutch 106. The combustion engine 101 is controlled by the control system of the vehicle 100 via an engine control device 115. Likewise, in the present example, the clutch 106 and the gearbox are controlled by a control device 116.

Further, an output shaft 107 from the gearbox 103 drives the driving wheels 113, 114 via a final gear 108, e.g. a customary differential, and the drive shafts 104, 105 connected to said final gear 108. FIG. 1A thus shows a powertrain of a certain type, but the invention is applicable at all types of powertrains, and also at all types of vehicles, such as in electric vehicles and hybrid vehicles. The displayed vehicle also comprises an after-treatment system 130 for after-treatment (purification) of the exhausts resulting from the combustion in the combustion engine. The after treatment system's functions are controlled by a control device 131.

Furthermore, the vehicle comprises a coordinating control device 117, which has the overall responsibility for the vehicle's control systems. For example, a vehicle may comprise several communication buses to which control devices may be connected, where communication between the communication buses and/or the control devices may be controlled/monitored by the coordinating control device 117. The coordinating control device may thus control/monitor the communication among the control devices 115, 116, 131.

Accordingly, FIG. 1A shows a vehicle with a control system comprising four control devices. Vehicles of the type displayed usually comprise a significantly larger number of control devices, but for the sake of simplicity only a limited number of control devices are displayed in FIG. 1A. Generally such control systems thus consist of a communications link system consisting of one or several communication buses to connect a number of electronic control devices (ECUs), or controllers, and different components arranged in the vehicle 100. Such a control system may thus comprise a large number of control devices, and the responsibility for a specific function may be distributed among more than one control device.

The control devices monitor the vehicle's function and components, and if any function/component displays a deviant behaviour, an error code may be activated to facilitate diagnosis of the vehicle at e.g. the next garage visit. The control system may be arranged to monitor a large number of functions and parameters, and a vehicle may comprise a large number of possible errors with associated error codes, where an error node is activated if the conditions specified for activation are met. For example, an error code may relate to a malfunction in a sensor, where this may be determined e.g. because a signal emitted the sensor differs from an expected signal. The condition for the error code to be activated may e.g. comprise that a difference must have occurred during at least a certain time for the criterion to be deemed met and the error code thus to be activated. Several conditions may thus be required to be met for an error code to be activated.

The different control devices may each be arranged to monitor the functions for which the respective control device is responsible, and when applicable, activate one or several error nodes. These error codes may then be read, e.g. by way of a diagnostic tool and e.g. at a garage visit, so that the error codes may be used for diagnosis of the vehicle, where such diagnosis may comprise troubleshooting to remedy errors.

Such troubleshooting works well when the error is due e.g. to a sensor's malfunctioning, but it may still be difficult to find errors that only arise in certain situations, and may thus not with certainty be induced during a garage visit, with the consequence that it may be very difficult to find, the cause of the malfunction.

The present invention relates to a method to further facilitate diagnosis, and an example method 200 according to the present invention is displayed in FIG. 2.

The method according to the present invention may be arranged to be carried out by some applicable control device in the vehicle's 100 control system, or in several or all control devices in the vehicle. The function according to the present invention may thus e.g. be implemented in all of the above exemplified control devices, as well as in additional control devices in the vehicle. The control devices may be responsible for the respective sets of error codes, and thus activate error codes independently of each other, but also based on information received from other control devices.

The control devices determination of whether an error code should be activated may e.g. depend on signals from the sensor(s) connected to the respective control devices. The sensors may be arranged to emit an electronic signal representing a measurement value for the quantity being monitored by the sensor.

Furthermore, information received from other control devices may also entail that conditions for activation of an error code are met. For example, the cause of activation of an error code in a control device may entail that limitations arise for functions controlled by one or several other control devices, so that error codes relating to these function may in turn be activated in other control devices.

If, for example, the control device 131 for control of an after-treatment system's function activates an error code with respect to e.g. emissions of nitrogen oxides, which may e.g. be determined based on signals from an NO sensor (not displayed), a message with information regarding a high nitrogen oxide level may be communicated via an applicable communications link, so that such information may be taken into consideration by other control devices. For example, such information may be received by the engine control device 115, and as a consequence the engine control device 115 may in turn activate one or several error codes, where one condition for activation consists of: emission levels relating to nitrogen oxides having to be too high. The activated error code may in turn have the effect that the combustion engine's maximum deliverable power is reduced, with reduced driveability as a consequence. Relatively extensive conditions may thus prevail for an error code to be activated.

Furthermore, the control devices control of different functions is often controlled by programmed instructions. These programmed instructions typically consist of a computer program which, when executed in the control device, causes the control device to carry out the desired control action, such as for control of the different functions in the vehicle, and also to carry out method steps according to the present invention.

The computer program is usually a part of a computer program product, where the computer program product comprises an applicable storage medium 121 (see FIG. 1B), with the computer program stored on said storage medium 121. The computer program may be stored in a non-volatile way on said storage medium.

Said digital storage medium 121 may e.g. consist of any from the following group: ROM (Read-Only Memory), PROM (Programmable Read-Only Memory), EPROM (Erasable PROM), Flash, EEPROM (Electrically Erasable PROM), a hard disk unit, etc., and may be set up in or in combination with the control device, where the computer program is executed by the control device. By changing the computer program's instructions, the vehicle's behaviour may thus be adjusted in a specific situation.

Figure 1B:
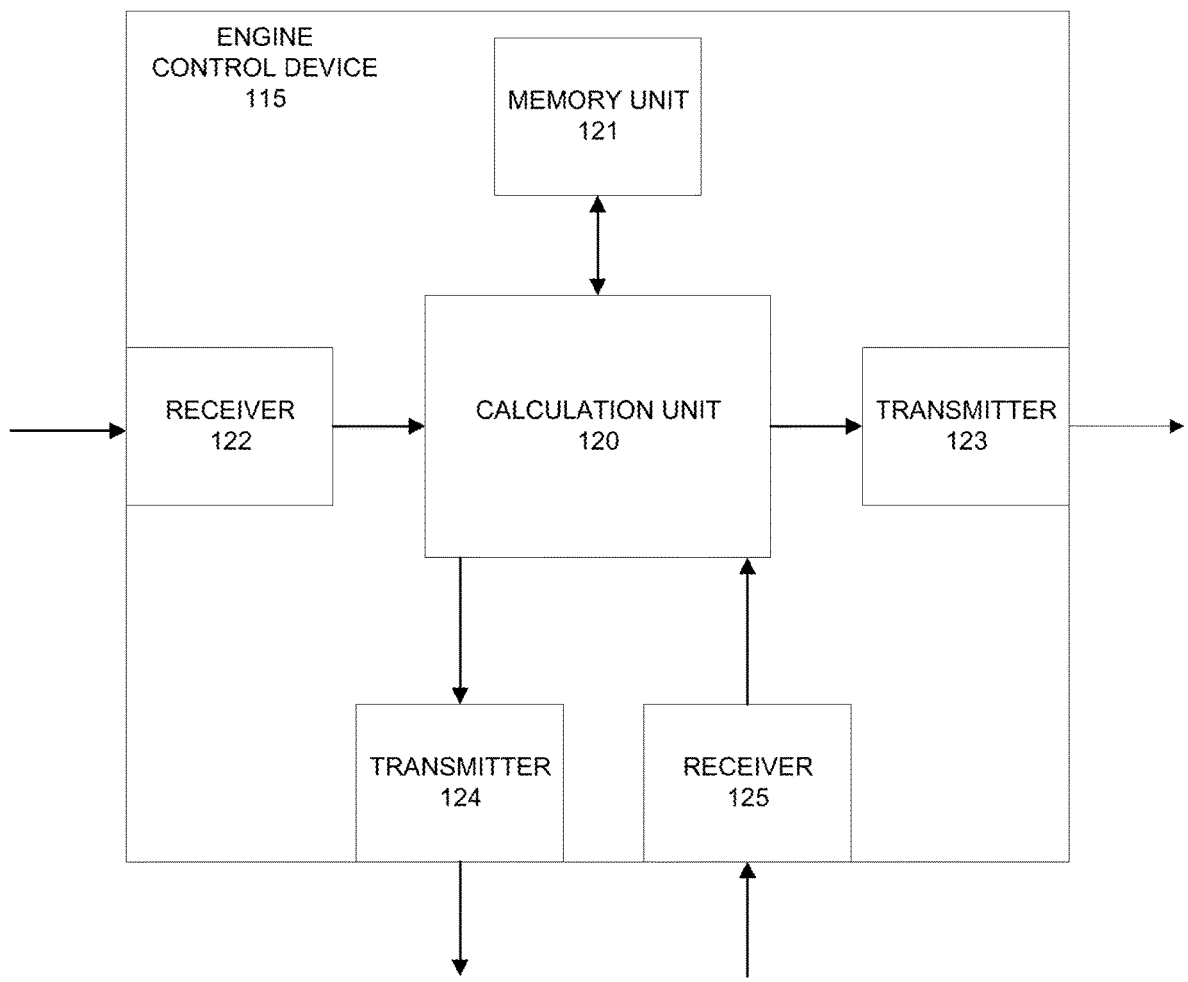
FIG. 1B shows a control device in a vehicle control system.

An example control device (engine control device 115) is shown schematically in FIG. 1B, and the control device in turn may comprise a calculation unit 120, which may consist of e.g. a suitable type of processor or microcomputer, e.g. a circuit for digital signal processing (Digital Signal Processor, DSP), or a circuit with a predetermined specific function (Application Specific Integrated. Circuit, ASIC). The calculation unit 120 is connected to a memory unit 121, which provides the calculation unit 120 with e.g. the stored program code and/or the stored data that the calculation unit 120 needs in order to be able to carry out calculations, e.g. to determine whether an error code should be activated. The calculation unit 120 is also set up to store interim or final results of calculations in the memory unit 121.

Further, the control device is equipped with devices 122, 123, 124, 125 for receiving and sending of input and output signals. These input and output signals may contain waveforms, pulses or other attributes which, by the devices 122, 125 for the receipt of input signals, may be detected as information for processing by the calculation unit 120. The devices 123, 124 for sending output signals are arranged to convert the calculation result from the calculation unit 120 into output signals for transfer to other parts of the vehicle's control system and/or the component(s) for which the signals are intended. Each one of the connections to the devices for receiving and sending of input and output signals may consist of one or several of the following: a cable, a data bus, such as a CAN (Controller Area Network) bus, a MOST (Media Oriented. Systems Transport) bus, or any other bus configuration, or a wireless connection.

Reverting to the 2 displayed example method 200 data is stored which may be used at a subsequent diagnosis. At step 201 it is determined whether an error code is activated, and as lone as this is not the case, i.e. if no error code is activated, the method remains at step 201. If, on the other hand, an error code is activated, the method continues to step 202, where it is determined whether the error code has been or will be deactivated. Normally, an error code is activated as above when the conditions for activation of the error code are met, and as long as the conditions continue to be met, the error code remains activated.

If the conditions for activation of an error code are no longer met, the error code is not erased, but instead the error code is marked as deactivated. This entails that e.g. a garage technician may, during a garage visit, read the error code and conclude that it was activated and subsequently deactivated because the conditions for the error to be deemed to prevail were no longer met.

According to the present invention, at step 202 it is thus determined, according to one embodiment, whether the error code, or any of the error codes if several are activated, have been deactivated, wherein the method step continues to step 203. According to one embodiment of the invention, it is not determined whether the error code is deactivated, but instead at step 202 it is determined whether the conditions for the error code to be activated are no longer met, and if this is the case, the method continues to step 203. Otherwise the method remains at step 202. At step 203, a "snapshot" of the state for at least a part of the vehicle is determined by determining a number of prevailing parameter values for a set of different parameters when the error code has been deactivated. This is carried out according to one embodiment, when or substantially when the error code is deactivated, such as immediately when it is determined that the error code has been deactivated, or when it is determined that the conditions for the error code to be activated are no longer met. Generally, everything in the description below that relates to deactivation is equally valid when it is determined that the conditions for the error code to be activated are no longer met.

The method displayed in FIG. 2 may be arranged to be run through several times per second, so that the method will thus reach step 203 a very short time after the error code has been deactivated, so that an image of the prevailing stats of the vehicle 100 at deactivation may be obtained.

The set of parameters for which parameter values are stored may consist of a relatively large number of parameters, such as any number of parameters within the range 5-200 or more. The parameters for which parameter values are stored may relate to functions distributed over the entire vehicle. Examples of such parameters for which prevailing parameter values are stored at deactivation of the error code consist of, but are not in any way limited to: different temperatures at different positions in the vehicle, engine speed, air flow, fuel flow, throttle position, vehicle speed, settings for the vehicle's transmission, parameters relating to exhaust flow, exhaust emissions, battery voltage, etc.

Overall, parameter values for a large number of parameters may thus be determined. These parameter values are then stored at step 204 in an applicable manner associated with the error code, so that a garage technician may read the parameter values prevailing for the different parameters when the error code was deactivated. The method is then completed at step 205. Alternatively, the method returns to step 201 in order to again determine whether an error code is activated.

By way of summary, the present invention thus provides a method for storage of parameter values at the point in time for deactivation of an error code, so that troubleshooting may be facilitated, since the state of the vehicle 100 at the time of deactivation may be assessed, and the causes of the error code activation may more easily be discovered through knowledge about the state of the vehicle 100 when the error code was deactivated.

The storage of said parameter values at deactivation of said error code is preferably carried out exactly at the deactivation of the error code, but at least within a first time from said deactivation of said first error code. This first time may consist of some applicable time, such as a certain number of tenths of a second, or a certain number of seconds.

According to one embodiment of the invention, a set of parameter values is stored for a set of parameters also when the error code is activated. The invention may thus comprise method steps where it is determined whether an error code is activated, in a similar manner as it is determined at step 202 whether an error code is deactivated, so that the parameter values may be stored when the activation or an error code is detected. The set of parameters for which parameter values are stored at activation of the error code may be arranged to wholly or partly correspond to the set of parameters for which parameter values are stored at deactivation of the error code.

By storing parameter values both at activation and deactivation of the error code, a very good troubleshooting may be carried out, where differences between the two sets of parameter values may provide an indication of the cause of the conditions for the error code's activation having been met, and the error code accordingly having been activated. One embodiment of the present invention relates to a method for diagnosis of a first function, where parameter values are determined at deactivation of the error code for use at diagnosis of said first function. According to one embodiment of the method for diagnosis of a first function, parameter values are determined both at activation and deactivation of the error code, so that determined parameter values may be compared with each other at the diagnosis of said first function.

Furthermore, an error code may be activated deactivated several times during a vehicle journey, or between garage visits. According to one embodiment of the invention, parameter values are stored every time the error code is deactivated, and according to one embodiment also every time the error code is activated. By proceeding in this manner, a good idea of the vehicle's prevailing conditions at activation and deactivation of an error code may thus be obtained, and diagnosis is also facilitated. According to one embodiment, only the most recently determined sets of parameters are stored, i.e. for the most recent occasion when the error code was deactivated and/or activated. According to one embodiment, sets of parameters are stored only the first time the error code is deactivated and/or activated.

The above method may thus be arranged to be carried out by several or all control devices in the vehicle and where each control device may be arranged to activate and deactivate several different error codes based on the different conditions for activation.

The present invention has been exemplified above in relation to vehicles. The invention is, however, also applicable in any means of transport, such as aircraft or water craft, and also in industrial installations where a control system is used to control functions and where the parameters relating to physical conditions for the device to be controlled by the control system may be determined.

Other embodiments of the method and the system according to the invention are available in the claims enclosed hereto. It should also be noted that the system may be modified according to various embodiments of the method according to the invention (and vice versa) and that the present invention is in no way limited to the above embodiments of the method according to the invention, but relates to and comprises all embodiments within the scope of the enclosed independent claims.

The invention claimed is:

1. A method to determine parameter values after an activation of a first error code in a control system, wherein said control system comprises at least one control device for control of at least one first function at least partly with the use of sensor signals, and wherein said at least one control device is arranged to activate said first error code when a first condition for activation of said first error code has been met, wherein, where said first error code has been activated, the method comprises:
monitoring said first condition;
determining when said first condition for activation of said first error code is no longer met; and upon said determining, initiating and recording parameter values for a first set of parameters occurring when said first condition for the first error code is no longer met.

2. The method according to claim 1 further comprising determining said parameter values for said first set of parameters within a first time as of the moment when said first condition is no longer met.

3. The method according to claim 1, wherein said first error code is deactivated when said first condition is no longer met, and wherein the method further comprises:
determining whether said first condition for activation of said first error code is met by determining whether said first error code has been deactivated.

4. The method according to claim 3, wherein when said first error code has been activated after having been deactivated, said method further comprising:
determining when said first error code has been deactivated again; and
determining a second set of parameter values for a second set of parameters where said first error code has been deactivated again.

5. The method according to claim 4, wherein said second set of parameters for which parameter values are determined at least partly overlap with said first set of parameters.

6. The method according to claim 1, where the conditions for said first error code are met again after a period where the conditions were not met, wherein said method further comprises:
determining when said first condition for activation of said first error code is no longer met; and
determining a second set of parameter values for a second set of parameters when it is determined that said first condition for the first error code is no longer met.

7. The method according to claim 4, further comprising: when said first error code is activated, determining parameter values for a third set of parameters.

8. The method according to claim 7, wherein said third set of parameters consists of a set of parameters which at least partly overlaps with said first set of parameters.

9. The method according to claim 1, wherein said first error code consists of one or several error codes, wherein, when one of said several error codes has been activated, the method comprises:
determining when conditions for activation of said one of said several error codes are no longer met; and
determining parameter values for a set of parameters of said first set of parameters, when it is determined that said conditions are no longer met.

10. The method according to claim 1, wherein at least a partial amount of said first set of parameters represents physical quantities.

11. The method according to claim 1, wherein said first set of parameters comprises at least one from among the group: one or several temperatures, engine speed, air flow, fuel flow, gas flow, throttle position, vehicle speed, settings with respect to a transmission, one or several parameters relating to exhaust emissions, battery voltage.

12. The method according to claim 1, wherein said control system consists of a control system arranged in a vehicle, and wherein said first set of parameters are vehicle condition parameters.

13. A method for diagnosis of a first function based on an activation of a first error code associated with said first function, when one of several error codes has been activated, the method comprises:
monitoring said first condition;
determining when said first condition for activation of said first error code is no longer met; and
upon said determining, initiating and recording parameter values for a first set of parameters occurring when said first condition for the first error code is no longer met.

14. The method according to claim 13, further comprising:
carrying out said diagnosis of said first function at least partly based on parameter values relating to a first set of parameters and a second set of parameters determined when said first error code has been deactivated again and which at least partly overlaps with said first set of parameters, wherein, at said diagnosis, said first set of parameter values is compared with said second set of parameter values.

15. The method according to claim 13, wherein said first function consists of a function in a vehicle, and wherein said first set of parameters are vehicle condition parameters.

16. A computer program product comprising a program code stored on a non-transitory computer readable medium, wherein when said program code is executed in a computer, where a first error code has been activated, said program code causes said computer to:
determine whether a first condition for activation of a first error code is no longer met, wherein the first error code is in a control system, wherein said control system comprises at least one control device for control of at least one first function at least partly with a use of sensor signals, and wherein said at least one control device is arranged to activate said first error code; and
upon determination that a first condition for activation of a first error code is no longer met, initiate and record parameter values for a first set of parameters occurring when said first condition for the first error code is no longer met.

17. The computer program product according to claim 16, wherein said control system is arranged in a vehicle, and wherein said first set of parameters are vehicle condition parameters.

18. A system to determine parameter values after an activation of a first error code in a control system, wherein said system comprises at least one control device for control of at least one first function at least partly with the use of sensor signals, and wherein said at least one control device is arranged to activate said first error code when a first condition for activation of said first error code is met, wherein the system comprises:
an electronic storage device;
at least one electronic processor in communication with said electronic storage device;
at least one module stored in said electronic device, executable by the at least one processor, and configured such that where said first error code has been activated to cause said at least one processor:
to monitor said first condition;
to determine when said first condition for activation of said first error code is no longer met; and
to determine parameter values for a first set of parameters when it is determined that said first condition for the first error code is no longer met
upon determination that a first condition for activation of a first error code is no longer met, to initiate and record parameter values for a first set of parameters occurring when said first condition for the first error code is no longer met.

19. The system according to claim 18, wherein said first function consists of a function in a vehicle, and wherein said first set of parameters are vehicle condition parameters.

20. A vehicle comprising a system to determine parameter values of said vehicle after an activation of a first error code in a control system, wherein said control system comprises at least one control device for control of at least one first function at least partly with the use of sensor signals, and wherein said at least one control device is arranged to activate said first error code when a first condition for activation of said first error code is met, wherein the system comprises:

an electronic storage device;

at least one electronic processor in communication with said electronic storage device;

at least one module stored in said electronic device, executable by the at least one processor, and configured such that where said first error code has been activated to cause said at least one processor:

to monitor said first condition;

to determine when said first condition for activation of said first error code is no longer met; and upon determination that a first condition for activation of a first error code is no longer met, to initiate and record parameter values for a first set of parameters occurring when said first condition for the first error code is no longer met.

\* \* \* \* \*